United States Patent Office 3,394,204
Patented July 23, 1968

3,394,204
2 - METHYL - 3,3,3, TRICHLORO - 1,2 - PROPANE-DIOL AND UNSATURATED POLYESTERS PREPARED THEREFROM
Aurel Blaga, 107 Camp Ave., Syracuse, N.Y. 13207, and Michael J. Skrypa, 113 Heather Lane, Camillus, N.Y. 13031
No Drawing. Original application Oct. 23, 1965, Ser. No. 504,476. Divided and this application June 16, 1967, Ser. No. 652,387
9 Claims. (Cl. 260—869)

ABSTRACT OF THE DISCLOSURE

Flame retardant unsaturated polyester resins can be prepared using the halogenated diol 2-methyl-3,3,3-trichloro-1,2-propanediol.

This invention relates to a new halogenated alkanediol monomer. More particularly, this invention relates to the preparation of a new halogenated propanediol, and to new fire-resistant unsaturated polyester-based thermosetting resin derived from said halogenated propanediol. This is a division of copending application Ser. No. 504,476, filed Oct. 23, 1965.

Fire-resistant thermosetting resins, such as the halogen containing polyester resins, have found widespread use throughout industry. For instance, such resins are used extensively in housings for electrical equipment and in the building trades where the polyesters are used to prepare structure members, wall coverings, panels and pipes. The resins employed in the foregoing application must be hard, infusible, insoluble polyester resins which are flame retardant, heat resistant and possess good mechanical and optical properties.

Fire-resistant, unsaturated polyester-based thermosetting resins having chemically bound halogen are well known. However, in the known halogenated polyester-based thermosetting resins, at least part of the chemically bound halogen is substituted in the portion of the molecules derived from the acidic reactants. These acidic reactants such as tetrachlorophthalic acid and anhydride; 1,4,5,6,7,7-hexachlorobicyclo (2·2·1)-hept-5-ene-2,3-dicarboxylic acid and anhydride; etc. have high melting points and are of relatively low reactivity because of the steric effect exerted by the ring-substituted chlorine. In esterification reactions involving these acidic reactants, drastic conditions, for example, long reaction times at relatively high temperatures and high concentrations of more reactive catalysts, are required. Such drastic conditions cause the products to be partly degraded, highly discolored and to have poor mechanical properties. Moreover, polyesters prepared from the above halogenated acids lack high temperature stability since they are more easily decarboxylated than their non-chlorinated analogues. Additionally, although the polyesters contain double bonds, they are not sufficiently reactive to readily copolymerize with cross-linking agents such as styrene to form thermosetting resin; therefore, the polyester must be modified to include further unsaturation. Furthermore, the halogenated dicarboxylic acids and anhydrides are expensive.

The prior art has also disclosed 3-chloro-1,2-epoxypropane as a chlorinated aliphatic monomer from which halogenated unsaturated polyester-based thermosetting resins can be derived. However, the resins produced are not fire-resistant and further the chemically bound chlorine is hydrolytically unstable.

It is the desideratum of the art to produce flame-resistant, halogenated, unsaturated polyesters in which the halogen is tightly bound, thus producing a chemically stable composition, yet the methods required to prepare such polyesters must not be such as to impair the optical and mechanical properites of the polyester. The preparation of halogenated, unsaturated polyesters from the new halogenated alkanediol monomer of this invention accomplishes these results.

It is therefore an object of the present invention to provide a new compound, the monomer 2-methyl-3,3,3-trichloro-1,2-propendial and a method for preparing said monomer. Another object of this invention is to provide new halogenated unsaturated polyester resins derived from 2-methyl-3,3,3-trichloro-1,2-propanediol and a method for preparing said polyesters. A further object of this invention is to provide new halogenated unsaturated polyester-based thermosetting resins and methods for preparing said resins.

Among the advantages obtained by employing the new alkanediol monomer of the present invention in the preparation of fire-resistant polyester resins is that the chemically bound chlorine is hydrolytically stable and exhibits good stability towards other chemical agents. Further, the new halogenated polyester resins of this invention are characterized by good mechanical and optical properties and surprisingly good fire-resistant properties. Moreover, this built-in fire resistance avoids the use of fire-proofing additives which tend to have adverse effects on the mechanical and optical properties of the cured resins.

The new alkanediol monomer of the present invention is prepared by the hydrolysis of 2-methyl-3,3,3-trichloro-1,2-epoxypropane which is a known compound that may be prepared by dehydrochlorinating 2-methyl-1,1,1,3-tetrachloro-2-propanol in a manner such as that described in copending United States application Ser. No. 504,193, now Patent No. 3,328,485.

The hydrolysis reaction is catalyzed by a mineral acid and proceeds according to the following chemical equation:

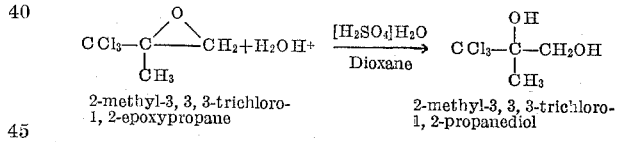

2-methyl-3, 3, 3-trichloro-1, 2-epoxypropane 2-methyl-3, 3, 3-trichloro-1, 2-propanediol The hydrolysis reaction is carried out with stirring at temperatures ranging from 30 to 125° C. The preferred temperature range is 85 to 105° C. The catalyst employed is an aqueous solution of a mineral acid such as sulfuric acid, nitric acid, phosphoric acid, p-toluenesulfonic acid and p-bromobenzenesulfonic acid dispersed in a water miscible organic solvent such as m-dioxane and p-dioxane. The concentrations of the aqueous acids may vary from 0.5 N to 8 N; the preferred concentration is 1 N to 6 N. A 5 N aqueous sulfuric acid dispersed in dioxane is the preferred catalyst.

Upon completion of the hydrolysis reaction, the reaction mixture is neutralized with a base such as sodium hydroxide, barium hydroxide and potassium hydroxide. On neutralization, the reaction mixture separates into two layers. The upper layer being an aqueous-water miscible solvent solution of the hydrolysis product, 2-methyl-3,3,3-trichloro-1,2-propanediol. The solvent is removed by distillation and the resulting clear colorless solid material is dried and recrystallized from an organic solvent such as toluene.

The following example illustrates the preferred method for preparing the new haloalkanediol monomer of the present invention:

Example I 2-methyl-3,3,3-trichloro-1,2-propanediol was prepared as follows:

2-methyl-3,3,3-trichloro-1,2-epoxypropane (878 gm.; 5.0 moles), 5 N aqueous sulfuric acid (2000 ml.) and p-dioxane (2300 ml.) were placed in a round-bottomed flask equipped with a mechanical stirrer, reflux condenser and a heating mantle. The reaction mixture was refluxed with stirring for 19–24 hours. The reaction mixture was cooled and then neutralized cautiously with sodium hydroxide, while the temperature was maintained at 20–25° C. by means of an ice bath. On neutralization, the reaction mixture separated into two layers. The lower layer consisted of an aqueous solution of sodium sulfate. The upper layer was an aqueous-dioxane solution of the hydrolysis product, 2-methyl-3,3,3-trichloro - 1,2 - propanediol. After removal of the solvent by distillation, the colorless solid material was dried. Recrystallization from toluene gave 420 gm. (43.3% yield) of solid 2-methyl-3,3,3-trichloro-1,2-propanediol, M.P. 144–145° C. Physical constants and analysis of the new haloalkanediol monomer are presented in the following table.

1,2-butanediol, 1,4-pentanediol, 1,5-pentanediol, 1,6-hexanediol, and the halogenated diols such as 3,4-dibromo-3-chloro-1,2-butanediol; 2,2,3,3-tetrachloro-1,4-butanediol; 2,3-dibromo-1,4-butanediol; 1,4-dichloro-2,3-butanediol; 1,4-diiodo - 2,3 - butanediol; 5-chloro - 1,2 - pentanediol; 2,5,5,5-tetrachloro-1,3-pentanediol; 2-chloro-1,5-pentanediol and the like. Among the epoxides which may be employed in conjunction with the new 2-methyl-3,3,3-trichloro-1,2-propanediol monomer of the present invention in the esterification reaction are: 3,3,3-trichloro-1,2-epoxypropane; 2-methyl-3,3,3-trichloro-1,2-epoxypropane; butyl glycidyl ether; 1,2-epoxypropane; 3-chloro-1,2-epoxypropane and the like.

In the preparation of the halogenated insaturated polyesters, the polycarboxylic acids and polyhydric alcohols are used in proportions varying over wide ranges, depending upon the properties desired in the resultant polyester. Generally the polycarboxylic acids and polyhydric alcohols are used in substantially equal proportions, about mol for mol, with desirably a slight excess of alcohol approximating about 10 percent above the stoichiometric quantity required for complete condensation being em- TABLE A.—PHYSICAL CONSTANTS AND ANALYSES OF 2-METHYL-3,3,3-TRICHLORO-1,2-PROPANEDIOL

| M.P., ° C. | Elemental Analysis | | | | | | Infrared Wave length (Cm.¹) | Absorption Band, Origin of Band |
|---|---|---|---|---|---|---|---|---|
| | Percent C | | Percent H | | Percent Cl | | | |
| | Calc'd. | Found | Calc'd. | Found | Calc'd. | Found | | |
| 144–145 | 24.85 | 24.97 | 3.65 | 3.86 | 55.00 | 55.02 | 3,400 (S) | O–H Stretching Vibration. |
| | | | | | | | 3,250 (S) | Do. |
| | | | | | | | 3,000–2,925 (W) | C–H Stretching Vibration. |
| | | | | | | | 1,453 (S) | C–H Bending Vibration. |
| | | | | | | | 1,380 (W) | Do. |
| | | | | | | | 1,150 (M.S) | C–O Stretching Vibration. |
| | | | | | | | 1,060 (S) | Do. |
| | | | | | | | 785 (S) | C–Cl Stretching Vibration. |
| | | | | | | | 675 (M) | Do. |

The 2-methyl-3,3,3-trichloro-1,2-propanediol obtained by the method described in Example I may be used to prepare halogenated unsaturated polyester resins, characterized by unexpectedly improved chemical stability, fire resistance, and good mechanical and optical properties. The polyesters are prepared by the condensation of the 2-methyl-3,3,3-trichloro-1,2-propanediol monomer with a great variety of acidic co-monomers (alpha,beta-unsaturated dicarboxylic acids, their acid halides or their acid anhydrides) or with any mixtures thereof. Examples of suitable unsaturated acidic co-monomers are: maleic acid and anhydride, fumaric acid, fumaryl chloride, dichloromaleic acid and anhydride, dichlorofumaric acid, itaconic acid and anhydride, citraconic acid and anhydride, aconitic acid and anhydride. Also, part of these unsaturated acidic monomers may be replaced by saturated acidic monomers or mixtures thereof such as aliphatic, cycloaliphatic or aromatic acids or their anhydrides. Some specific examples of such acidic monomers are: succinic acid, glutaric acid, adipic acid, pimelic acid, azelaic acid, sebacic acid, phthalic acid, tetrachlorophthalic acid, tetrabromophthalic acid or the anhydrides of these acids. Additional examples of acidic monomers which may be used are: endomethylene-tetrahydrophthalic acid, hexachloro-endomethylene-tetrahydrophthalic acid and their anhydrides. These latter-defined saturated acids and anhydrides may be used in conjunction with the above-defined unsaturated acids, acid halides or anhydrides or mixtures thereof.

It is also within the comtemplation of the present invention to employ mixtures of 2-methyl-3,3,3-trichloro-1,2-propanediol with other halogenated or nonhalogenated diols and epoxides in the polycondensation reaction with the above-noted acids, acid halides and acid anhydrides. Illustrative of such diols are: ethylene glycol, propylene glycol, dipropylene glycol, 1,4-butanediol, 1,3-butanediol, ployed. The condensation is carried out at elevated temperatures and atmospheric pressure, although pressures slightly above or below atmospheric may be employed if desired. The temperature at which this esterification is carried out is not critical, and the optimum temperature is usually just below the boiling point of the most volatile component of the reaction mixture. However, temperatures above the boiling point of the lowest boiling component of the reaction mixture may be used provided the reaction vessel is supplied with a steam heated reflux condenser, which will permit the water of esterification to escape from the reaction mixture while condensing volatilized components and returning them to the reaction mixture.

Since many of the resinifying reactants of the type employed in the condensation reaction are prone to develop color when in contact with air at elevated temperatures, it is desirable to conduct the condensation reaction in an inert atmosphere such as that obtained by bubbling an inert gas such as carbon dioxide or nitrogen through the esterifying mixture.

Additionally, a small amount of a catalyst may be employed to hasten the polycondensation reaction. Although the effectiveness of the catalytic agent employed is established for each particular case since it will vary for different materials, the usual polyesterification catalysts such as sulfuric acid, sodium hydrogen sulfate, zinc chloride, lead oxide and antimony oxide may be employed in amounts of from 0.005 to 0.15 percent based on the weight of the total charge, the preferred catalyst being antimony oxide used in proportions of from 0.05 to 0.1 percent based on the weight of the total charge.

The following example is given to illustrate the preparation of new halogenated unsaturated polyester resins based on the new 2-methyl-3,3,3-trichloro-1,2-propanediol monomer of this invention.

Example II

The reaction for the polycondensation of 2-methyl-3,3,3-trichloro-1,2-propanediol with fumaryl chloride may be illustrated by the following chemical equation:

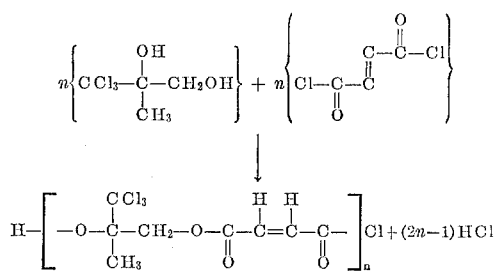

wherein $n$ represents the number of moles of propanediol and furmaryl chloride employed. The procedure for carrying out the above polycondensation is as follows: 2-methyl - 3,3,3 - trichloro - 1,2 - propanediol (96.7 gm.; 0.5 mole) and fumaryl chloride (76.5 gm.; 0.5 mole) were placed in a 200 ml. round bottomed flask equipped with a thermometer, mechanical stirrer, nitrogen inlet and an exit tube for nitrogen and hydrogen chloride. The exit tube is connected to a bubbler containing a 20% aqueous solution of sodium hydroxide for trapping the hydrogen chloride. The mixture was heated with stirring for 7 hours at 60° C., 58 hours at 100° C., and 50 hours at 125° C., while a stream of nitrogen was bubbled through the melt. Then water (4 ml.) was added to hydrolyze the unstable acid chloride groups and the mixture stirred for 2 hours at 125° C. The reaction product was a light amber, amorphous solid mass.

The halogen-containing unsaturated polyesters based on 2-methyl-3,33-trichloro-1,2-propanediol such as that prepared in Example II above, are subsequently reacted with vinyl compounds, i.e. polymerizable ethylenically unsaturated monomers, to obtain fire-resistant, polyester-based thermosetting resins which are useful in reinforced plastic applications, e.g. potting and other industrial purposes, press molding and hand lay-up in conjunction with glass-fiber reinforcement.

The temperature at which the copolymerization between the new halogen containing polyesters and the vinyl compounds is effected depends on a variety of factors, particularly the boiling point of the olefinic cross-linking agent and the exothermic characteristics of the polymerization mixture. A temperature is selected which will give a suitable reaction rate and yet not cause substantial volatilization, and in the case of producing very thick castings, which will not produce a product which is crazed, cracked, etc. The copolymerization is preferably carried out at temperatures ranging from room temperature (about 20° C.) to 150° C. in the presence of a conventional polymerization catalyst such as methyl ethyl ketone peroxide, which is the preferred polymerization catalyst, di-t-butyl peroxide, benzoyl peroxide, lauroyl peroxide, cyclohexanone peroxide and azo compounds, such as azobisisobutyronitrile. The catalysts are employed in amounts of from 0.01 to 10 percent, preferably from 0.1 to 1 percent based on the total composition.

Additionally, a small amount of a promoter may be incorporated with the catalyst to hasten gelation and cure of the thermosetting resin. Suitable promoters are the metallic salt driers, such as cobalt naphthenate, which are desirably employed in amounts of less than 1.0 percent, preferably in amounts ranging from 0.15 to 0.5 percent, based on the weight of the total composition.

The ethylenically unsaturated monomeric cross-linking agent which is copolymerized with the new chlorine containing unsaturated polyester is a polymerizable material containing a $CH_2=C<$ group such as styrene, which is the preferred cross-linking agent, vinyl acetate, divinyl benzenes, vinyl toluene, alpha halostyrenes, acrylic esters, methacrylic esters, triallyl cyanurate, triallyl citrate, tetrallylsilane and the like. The ratio of halogen containing unsaturated polyester to monomeric cross-linking agent can be varied over a wide range. The halogen containing unsaturated polyester content may range from 10 to about 90 percent of the polymerizable mixture. Preferably the polymerizable mixture contains 30 to 40 percent cross-linking agent and correspondingly from 60 to 70 percent halogenated unsaturated polyester resin.

Example III.—Preparation of thermosetting resin

To 63.0 gm. of halogenated, unsaturated polyester resin prepared as described in Example II heated to 120° C. was added 37.0 gm. of styrene containing 0.03 gm. of t-butylhydroquinone. The styrene solution was cast into rods (2 inches x ¾ inch diameter) at room temperature with 1% methyl ethyl ketone as a catalyst and 0.15% cobalt naphthenate as a promoter. The casting was a light amber, tough, insoluble and infusible material. It had a self-extinguishing time of 15 seconds according to ASTM D635–56T Test. The cast resin had a chlorine content of 24%.

We claim:

1. A process for producing a halogenated, unsaturated polyester which comprises heating a mixture comprising (1) a compound selected from the group consisting of (A) alpha,beta-unsaturated dicarboxylic acids, acid halides, acid anhydrides and mixtures thereof and (B) mixtures of said alpha,beta-unsaturated dicarboxylic acids, acid halides, acid anhydrides and mixtures thereof with saturated aliphatic, cycloaliphatic and aromatic dicarboxylic acids, anhydrides and mixtures thereof and (2) a compound selected from the group consisting of 2-methyl-3,3,3-trichloro-1,2-propanediol and mixtures thereof with diols and epoxides in the presence of an esterification catalyst.

2. A process for producing a halogenated, unsaturated polyester which comprises heating a mixture comprising (1) an alpha,beta-unsaturated acid halide and (2) 2-methyl-3,3,3-trichloro-1,2-propanediol in the presence of an esterification catalyst.

3. The process of claim 2 wherein said unsaturated acid halide is fumaryl chloride.

4. The process of claim 2 wherein said catalyst is antimony trioxide.

5. A process for preparing thermosetting resin compositions which comprises polymerizing (1) the polycondensation reaction product of (A) a compound selected from the group consisting of alpha,beta-unsaturated dicarboxylic acids, acid halides, acid anhydrides and mixtures thereof, mixtures of said alpha,beta-unsaturated dicarboxylic acids, acid halides, acid anhydrides and mixtures thereof with saturated aliphatic, cycloaliphatic and aromatic dicarboxylic acids, anhydrides and mixtures thereof and (B) a compound selected from the group consisting of 2-methyl-3,3,3-trichloro-1,2-propanediol and mixtures thereof with diols and epoxides and (2) an ethylenically unsaturated monomeric cross-linking agent at temperatures ranging from 20 to 150° C. in the presence of a polymerization catalyst.

6. The process of claim 5 wherein said cross-linking agent is styrene.

7. The process of claim 5 wherein said polyester is obtained by esterifying substantially equal molar proportions of an alpha,beta-unsaturated dicarboxylic acid halide and 2-methyl-3,3,3-trichloro-1,2-propanediol.

8. The process of claim 7 wherein said unsaturated dicarboxylic acid halide is fumaryl chloride.

9. The process of claim 5 wherein said polymerization catalyst is methyl ethyl ketone peroxide.

(References on following page)

References Cited

UNITED STATES PATENTS

| | | | |
|---|---|---|---|
| 2,783,215 | 2/1957 | Robitchek et al. | 260—869 |
| 3,060,146 | 10/1962 | Wismer | 260—869 |
| 2,086,077 | 7/1937 | Groll et al. | 260—633 |
| 3,251,903 | 5/1966 | Davis | 260—869 |
| 3,328,485 | 7/1967 | Blaga et al. | 260—869 |

MURRAY TILLMAN, *Primary Examiner.*

J. T. GOOLKASIAN, *Assistant Examiner.*